United States Patent [19]
Ferri, Jr. et al.

[11] Patent Number: 5,632,960
[45] Date of Patent: May 27, 1997

[54] TWO-STAGE CHEMICAL MIXING SYSTEM

[75] Inventors: Edward T. Ferri, Jr., Gilroy, Calif.; J. Tobin Geatz, Wrightsville Beach, N.C.; Randall L. Green, Watsonville, Calif.

[73] Assignee: Applied Chemical Solutions, Inc., Hollister, Calif.

[21] Appl. No.: 554,787

[22] Filed: Nov. 7, 1995

[51] Int. Cl.$^6$ .................................. G05D 9/00
[52] U.S. Cl. .................. 422/106; 366/152.2; 366/153.1; 366/162.1; 422/111
[58] Field of Search ................... 422/106, 110, 422/111, 256; 366/132, 152.1, 152.2, 153.1, 162.1

[56] References Cited

U.S. PATENT DOCUMENTS

| | | | |
|---|---|---|---|
| 3,877,682 | 4/1975 | Moss | 259/7 |
| 3,960,295 | 6/1976 | Horak | 222/145 |
| 4,019,528 | 4/1977 | Tyrrell | 137/209 |
| 4,106,671 | 8/1978 | Sharples | 222/61 |
| 4,223,806 | 9/1980 | Buschmann | 222/23 |
| 4,242,841 | 1/1981 | Ushakov et al. | 366/153.1 |
| 4,362,033 | 12/1982 | Young | 366/153.1 |
| 4,380,248 | 4/1983 | Ambrus et al. | 137/428 |
| 4,475,821 | 10/1984 | Koch et al. | 366/160 |
| 4,523,854 | 6/1985 | Beckley | 366/132 |
| 4,580,699 | 4/1986 | Black et al. | 222/64 |
| 4,823,987 | 4/1989 | Switall | 222/63 |
| 4,863,277 | 9/1989 | Neal et al. | 366/137 |
| 5,108,655 | 4/1992 | Johns, Jr. et al. | 422/106 |
| 5,137,694 | 8/1992 | Copeland et al. | 422/106 |
| 5,148,945 | 9/1992 | Geatz | 222/1 |
| 5,330,072 | 7/1994 | Ferri, Jr. et al. | 222/1 |
| 5,340,210 | 8/1994 | Patel et al. | 366/132 |
| 5,348,389 | 9/1994 | Jönsson et al. | 366/136 |
| 5,370,269 | 12/1994 | Bernosky et al. | 222/61 |
| 5,417,346 | 5/1995 | Ferri, Jr. et al. | 222/61 |
| 5,490,611 | 2/1996 | Bernosky et al. | 222/1 |

FOREIGN PATENT DOCUMENTS 73 18826  12/1974  France .

*Primary Examiner*—Timothy McMahon
*Attorney, Agent, or Firm*—Faegre & Benson

[57] ABSTRACT

A chemical mixing system for mixing ultra pure water and concentrated HF to a desired concentration within a qualification range. Batches of the mixed chemical are mixed in a relatively small mix vessel and transferred to a relatively large mix drum. The concentration of the chemical within the mix drum is measured by a concentration monitor. If the measured concentration of the chemical in the mix drum is within the qualification range, the batches of chemical in the mix vessel are mixed to the desired concentration. If the measured concentration of the chemical in the mix drum is below the qualification range, the batches of chemical in the mix vessel are mixed to a high concentration which is greater than the desired concentration. If the measured concentration of the chemical in the mix drum is above the qualification range, the batches of chemical in the mix vessel are mixed to a low concentration which is less than the desired concentration. Batch averaging is thereby performed to maintain the concentration of chemical in the mix drum within the desired qualification range.

10 Claims, 3 Drawing Sheets

SYSTEM 10

CONTROL SYSTEM 60

TWO-STAGE CHEMICAL MIXING SYSTEM

BACKGROUND OF THE INVENTION

1. Field of the Invention

The present invention is a chemical blending or mixing system. In particular, the invention is a system for mixing concentrated chemicals from two or more chemical components for subsequent use in semiconductor fabrication facilities.

2. Description of the Related Art

Chemical generation or mixing systems are used in a variety of industrial applications to blend two or more components or constituents to a desired concentration. In semiconductor fabrication facilities, for example, concentrated chemicals (which are usually provided by commercial chemical suppliers in solution with water) are commonly mixed or diluted with DI (deionized or ultra pure) water before being sprayed on or otherwise applied to semiconductor wafers. Table 1 below lists a number of chemicals used in semiconductor fabrication facilities, and the concentration (in weight %) in which these chemicals are typically provided by suppliers.

TABLE 1

| Chemical | Symbol | Percentage Concentrate in Water |
|---|---|---|
| Hydrofluoric Acid | HF | 49% |
| Acetic Acid | HAC | 99.7% |
| Nitric Acid | $HNO_3$ | 71% |
| Phosphoric Acid | $H_3PO_4$ | 80% |
| Potassium Hydroxide | KOH | 30% |
| Tetramethyl Ammonium Hydroxide | TMAH | 25% |
| Hydrochloric Acid | HCl | 37% |
| HF and Ammonium Fluoride Mixtures | BOEs | — |
| Ammonium Hydroxide | $NH_4OH$ | 28–30% |
| Sulfuric Acid | $H_2SO_4$ | 93–98% |

When used in semiconductor fabrication facilities, the concentrated chemicals described above are commonly diluted with DI water (i.e., a diluent) to desired concentrations or assays. Concentrations in these applications are typically described in terms of weight % (weight percent) of concentrated or pure chemical in water. Hydrofluoric Acid (HF), for example, is often diluted with ultra pure water to concentrations ranging from about 0.5%–5% HF by weight when used for etching and cleaning processes. Tetramethyl Ammonium Hydroxide (TMAH) is often diluted to about 2.38 weight % for use as a positive photoresist developer. Non-aqueous blended chemicals, and blended chemicals with three or more components, can also be generated.

Chemical mixing systems blend the chemicals to a desired concentration which is sometimes known as the nominal or qualification concentration. A high degree of accuracy is also required. The range or window of acceptable concentrations surrounding the qualification concentration is known as the qualification range, and can be defined as a weight % error with respect to the qualification concentration, or by upper and lower qualification range concentrations. Chemical blending systems of the type described above are commercially available from a number of sources including FSI International of Chaska, Minn. and Applied Chemical Solutions of Hollister, Calif. They are also disclosed generally in the Geatz U.S. Pat. No. 5,148,945 and the Ferri, Jr. et al. U.S. Pat. No. 5,330,072.

There remains, however, a continuing need for improved chemical blending systems. In particular, there is a need for chemical blending systems capable of quickly blending batches of chemical to a very high degree of accuracy. To be commercially viable, the chemical blending systems must also be highly reliable.

SUMMARY OF THE INVENTION

The present invention is a chemical mixing system capable of quickly and accurately blending chemicals. One embodiment of the system is configured for mixing at least first and second chemical constituents to obtain mixed chemical having a desired concentration within a qualification range. The system includes a first constituent inlet for receiving a first chemical constituent, a second constituent inlet for receiving a second chemical constituent, a mix vessel and a mix drum. The first constituent inlet is fluidly coupled to the mix vessel by a first line including a first line valve. The second constituent inlet is fluidly coupled to the mix vessel by a second line including a second line valve. Batches of chemical are mixed in the mix vessel, and transferred to the mix drum through a line which includes a drum line valve for controlling the flow of mixed chemical to the mix drum. The level of chemical in the mix vessel is sensed by first, second, third and fourth mix vessel level sensing means. The first mix vessel level sensing means provides first vessel level signals when the mix vessel is filled to a first level. The first level corresponds approximately to the volume of the first chemical constituent that will provide mix vessel batches having the desired concentration. The second mix vessel level sensing means provides second vessel level signals when the mix vessel is filled to a second level. The second level is a level greater than the first level by an amount which corresponds approximately to the volume of the second chemical constituent that will provide mix vessel batches having the desired concentration. The third mix vessel level sensing means provides third vessel level signals when the mix vessel is filled to a third level which is greater than the first level and less than the second level. The fourth mix vessel level sensing means provides fourth vessel level signals when the mix vessel is filled to a fourth level which is greater than the second level. Signals representative of the concentration of mixed chemical within the mix drum are provided by a concentration monitor. A control system for controlling the mixing of the chemical constituents in the mix vessel and the transfer of the mix vessel batches to the mix drum is coupled to the first line, second line and drum line valves, the first second, third and fourth mix vessel level sensing means and the concentration monitor. The control system includes: a) first control means for actuating the first line valve to fill the mix vessel to the first level with the first chemical constituent; b) second control means for actuating the second line valve to fill the mix vessel from the first level to the second level with the second chemical constituent if the concentration of the blended chemical within the mix drum is within the qualification range; c) third control means for actuating the second line valve to fill the mix vessel from the first level to the third level with the second chemical constituent if the concentration of the blended chemical within the mix drum is greater than the qualification range; d) fourth control means for actuating the second line valve to fill the mix vessel from the first level to the fourth level with the second chemical constituent if the concentration of the blended chemical within the mix drum is less than the qualification range; and e) fifth control means for actuating the drum line valve to transfer the mix vessel batch of mixed chemical to the mix tank.

DETAILED DESCRIPTION OF THE PREFERRED EMBODIMENTS

Figure 1:
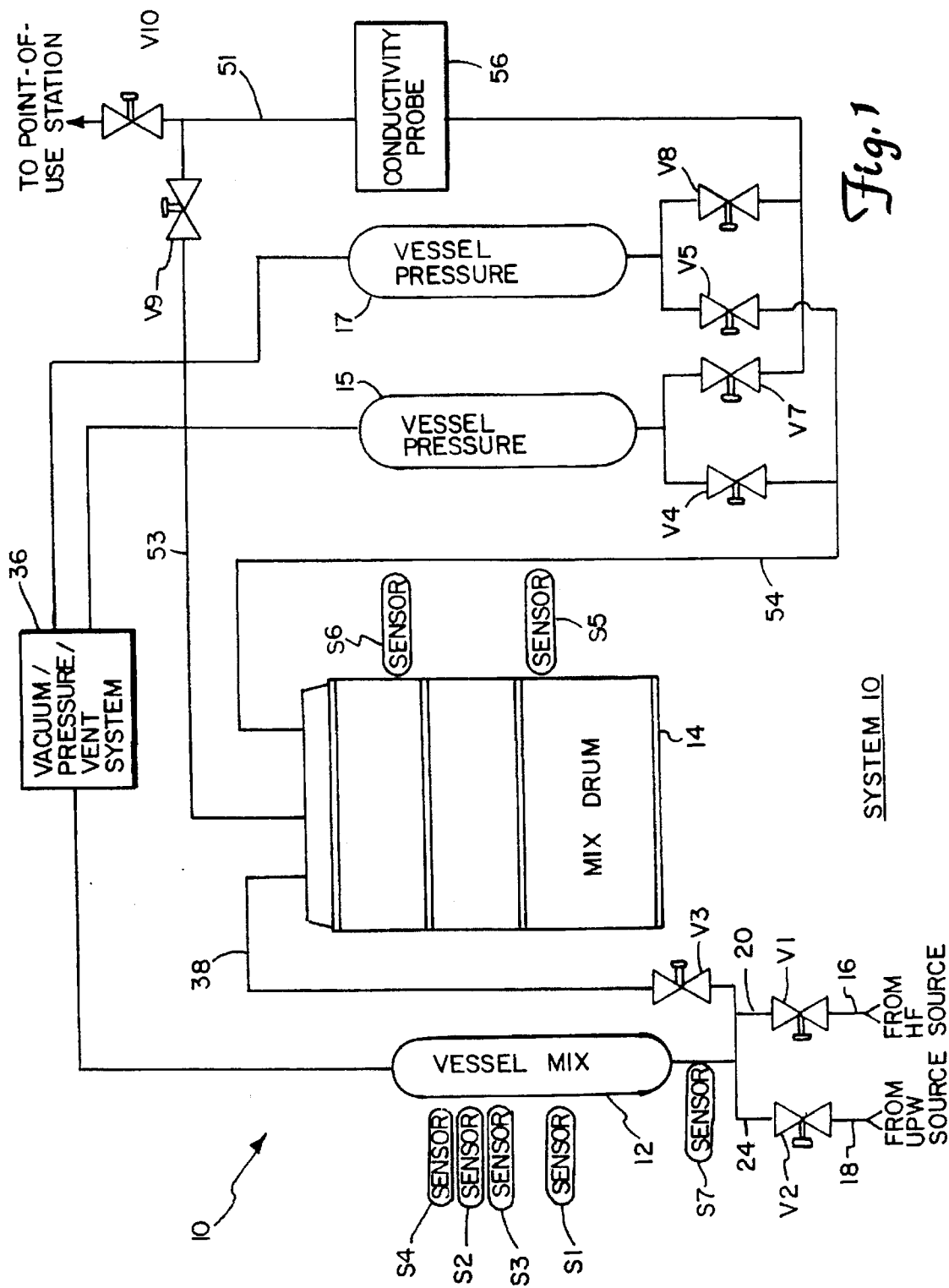
FIG. 1 is a diagrammatic illustration of a chemical mixing system in accordance with the present invention.

A chemical mixing system 10 in accordance with the present invention is illustrated generally in FIG. 1. As shown, system 10 includes mix vessel 12, mix drum 14, pressure/vacuum vessels 15 and 17, concentrated chemical inlet 16 and diluent inlet 18. Relatively small batches of chemical are mixed in mix vessel 12 and subsequently transferred to mix drum 14. The chemical in mix drum 14 is then blended together and stored until it is delivered to a point-of-use in a semiconductor fabrication facility. In one embodiment, mix vessel 12 has a nominal fluid capacity of about 1.5 gallons (5 liters), while mix drum 14 has a nominal capacity of about 15 gallons (50 liters). As is described in greater detail below, the volume ratios of the chemical constituents mixed within mix vessel 12 are controlled as a function of the monitored concentration of the mixed chemical within drum 14. In this manner mixing system 10 effectively utilizes a two-stage, batch averaging process to mix the chemical constituents to the desired concentration with a high degree of accuracy.

Vessels 12, 15 and 17 and drum 14 are fabricated from a material such as Teflon PFA (perfluoroalkoxy) or ultra high molecular weight polyethylene which is resistant to corrosion by the blended chemical. The illustrated embodiment of mixing system 10 is configured for diluting and mixing concentrated hydrofluoric acid (HF) with ultra-pure water (UPW). Concentrated chemical inlet 16 is therefore adapted to be fluidly coupled to a drum or other source of concentrated HF, while diluent inlet 18 is adapted to be fluidly coupled to a pressurized source of ultra-pure water. Concentrated chemical inlet 16 is fluidly coupled to mix vessel 12 by line 20. An on-off control valve V1 is positioned in line 20 to control the flow of HF through the line. Diluent inlet 18 is fluidly coupled to mix vessel 12 by line 24. On-off control valve V2 is positioned in line 24 to control the flow of ultra-pure water through the line. The fluid level within mix vessel 12 is monitored by first, second, third, fourth and seventh mix vessel level sensors S1, S2, S3, S4 and S7, respectively. As is described in greater detail below, a vacuum/pressure/vent system 36 is fluidly coupled to the mix vessel 12 and pressure/vacuum vessels 15 and 17, and is used to motivate the chemical constituents and mixed chemicals through system 10.

Mix vessel 12 is fluidly coupled to mix drum 14 by mix drum line 38. The flow of chemical through line 38 is controlled by on-off control valve V3. The fluid level within mix drum 14 is monitored by first and second mix drum level sensors S5 and S6, respectively. A line 54 is used to transfer mixed chemical from mix drum 14 to pressure/vacuum vessels 15 and 17. On-off control valves V4 and V5 are positioned in line 54 to control the flow of chemical into pressure/vacuum vessels 15 and 17, respectively. From pressure/vacuum vessels 15 and 17, chemical can be transferred to a point-of-use station (not shown) through distribution line 51 and on-off control valve V10 when valve V9 is closed. On-off control valves V7 and V8 are positioned to control the flow of chemical from pressure/vacuum vessels 15 and 17, respectively, into line 51. Alternatively, chemical in line 51 can be recirculated back to mix drum 14 through recirculation line 53 and on-off control valve V9 when valve V10 is closed.

Vacuum/pressure/vent system 36 is a conventional system which includes control valves (not separately shown) which couple mix vessel 12 and pressure/vacuum vessels 15 and 17 to both vacuum and pressure sources (also not shown). Systems of this type are well known and described, for example, in the Geatz U.S. Pat. No. 5,148,945 and the Ferri, Jr. et al. U.S. Pat. No. 5,330,072. Briefly, when it is desired to transfer chemical into one of vessels 12, 15 or 17 from a source, the associated control valve between the source and vessel is closed, and vacuum/pressure/vent system 36 is operated to create a vacuum within the vessel. The associated control valve between the source and vessel is then opened to allow the vacuum to draw chemical into the vessel from the source. To transfer chemical from one of vessels 12, 15 or 17 to a downstream location, the associated control valve between the vessel and the downstream location is opened, and the vacuum/pressure/vent system 36 is operated to pressurize the vessel and force the chemical therefrom. When a chemical constituent is provided by a pressurized source, system 36 vents the vessel to which the chemical constituent is to be transferred. Conventional pumps (e.g., diaphragm pumps) can be used in the lines addition to or in place of vacuum/pressure/vent system 36 to motivate chemical in system 10.

The concentration of the mixed chemical within drum 14 is monitored through the use of conductivity probe 56. Probe 56 is located in line 51 in the embodiment shown. In other embodiments (not shown), probe 56 can be positioned in other locations such as in lines 53 or 54 or within mix drum 14, depending on the characteristics of the monitor.

Figure 2:
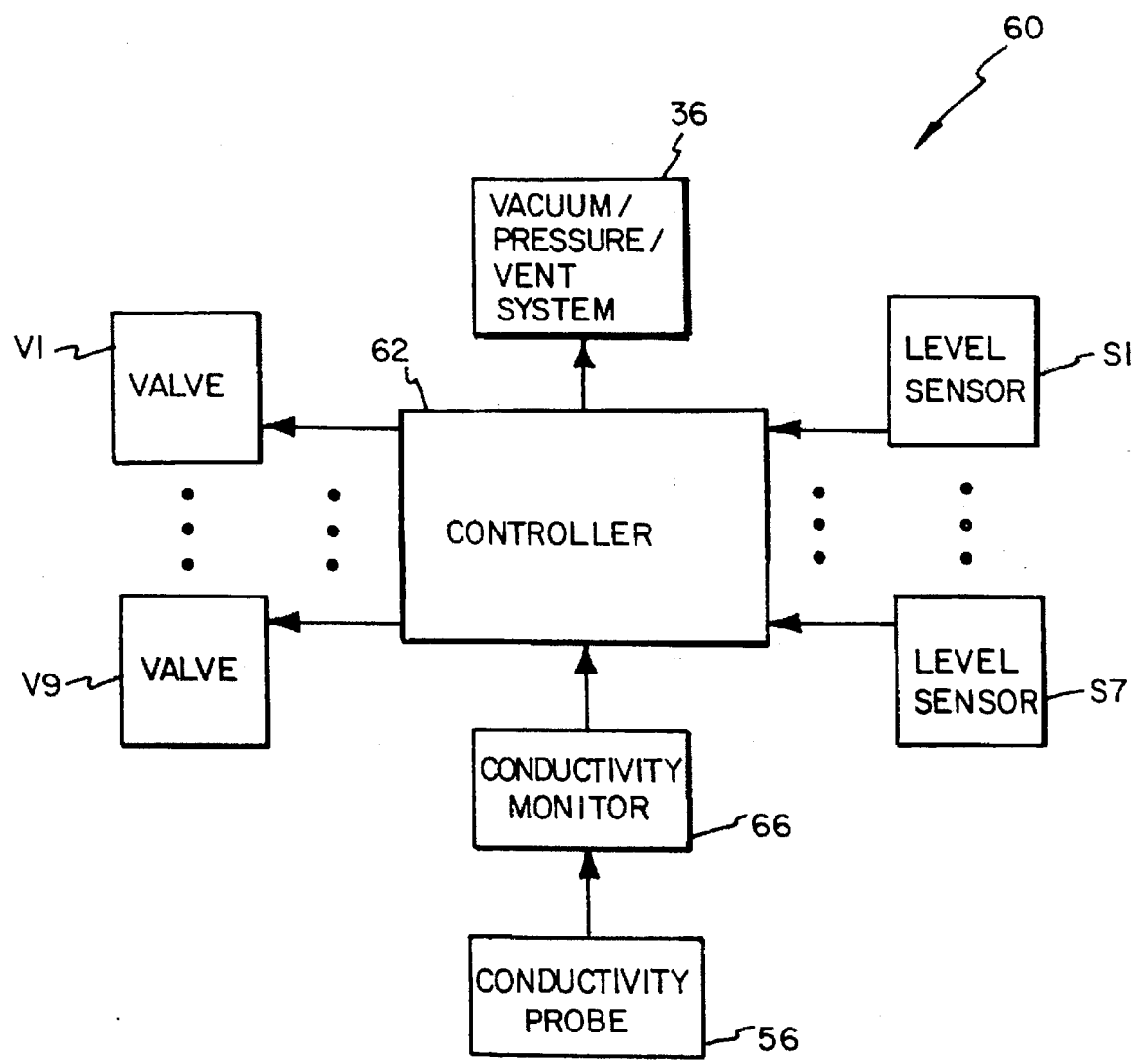
FIG. 2 is a block diagram of a control system for the chemical mixing system shown in FIG. 1.

FIG. 2 is a block diagram of a control system 60 used to control the operation of chemical mixing system 10. As shown, control system 60 includes a controller 62 which is interfaced to vacuum/pressure/vent system 36, control valves V1–V9 and level sensors S1–S7. Conductivity probe 56 is coupled to controller 62 through a conductivity monitor 66. The overall operation of system 10 is controlled by controller 62. Controller 62 is a digital programmable logic array in one embodiment, although hard-wired, microprocessor-based and other conventional control systems can also be used.

Monitor 66 drives conductivity probe 56 and processes signals received from the probe to generate digital concentration values representative of the weight percent concentration of the concentrated chemical flowing past the probe. Probes such as 56 and monitors such as 66 are well known and commercially available from a number of manufacturers such as Horiba Instruments Inc. A programmable conductivity monitor 66 is used in one embodiment of chemical mixing system 10. The programmable monitor 66 can be programmed with an Upper Qualification Range Setpoint and a Lower Qualification Range Setpoint. The Upper and Lower Qualification Range Setpoints are representative of mixed chemical concentrations above and below an ideal or desired mixed chemical concentration, respectively, and represent an acceptable window or range of final mixed chemical concentrations. The programmable monitor 66 provides signals to controller 62 indicating whether the measured chemical concentration is greater than the Upper Qualification Range Setpoint, less than the Lower Qualification Range Setpoint, or within the desired concentration range between the Upper and Lower Qualification Range Setpoints.

Level sensors S1–S7 are capacitive-type sensors in one embodiment of mixing system 10. These sensors S1–S7 are positioned at locations on the exterior of mix vessel 12 and mix drum 14 which correspond to predetermined levels or volumes of chemical within the vessel and drum. When the level of chemical within the mix vessel 12 and drum 14 increases or decreases to the level at which the sensors S1–S7 are located, the sensors provide signals representative of the level change condition to controller 62. Other types of level sensors such as those which provide a continuous indication of the chemical level can also be used.

In one embodiment of system 10, control valves V1–V9 are air-operated on-off valves. The supply of air used to actuate the control valves V1–V9 is coupled to the valves through solenoid valves (not separately shown) which are interfaced directly to controller 62. Control valves V1–V9 are therefore effectively responsive to and actuated by controller 62.

Relatively small batches of mixed chemical are mixed in mix vessel 12. Each such mix vessel batch will have a nominal batch volume. First mix vessel level sensor S1 is positioned at a first volume level on vessel 12. The first volume level corresponds approximately to a first chemical constituent volume that will yield a mix vessel batch having the desired concentration (i.e., the desired volume proportion of first chemical constituent to the nominal mix batch volume). Second mix vessel level sensor S2 is positioned at a second volume level on mix vessel 12. The second volume level is a volume level which is greater than the first volume level by an amount which corresponds approximately to a second chemical constituent volume that will yield a mix vessel batch having the desired concentration (i.e., greater than the first volume level by an amount equal to the desired volume proportion of the second chemical constituent to the nominal mix batch volume).

Third mix vessel level sensor S3 is positioned at a third volume level on vessel 12. The third volume level is less than the second volume level, but greater than the first volume level by an amount which corresponds approximately to a second chemical constituent volume that will yield a mix vessel batch having a concentration which is slightly less than the desired concentration. Fourth mix vessel level sensor S4 is positioned at a fourth volume level on vessel 12. The fourth volume level is greater than the second volume level, and is greater than the first volume level by an amount which corresponds approximately to a second chemical constituent volume that will yield a mix vessel batch having a concentration which is slightly greater than the desired concentration. The amount by which the concentration of the mix vessel batches is less and greater than the desired concentration, and therefore the third and fourth volume levels, will depend upon a number of factors including the "concentration" of the concentrated chemical as supplied by commercial vendors, the ratio of the nominal mix vessel batch volume to the desired average level of mixed chemical in the mix drum 14, and the rate at which it is desired to vary the concentration of the mixed chemical within the mix drum by the addition of each mix vessel batch.

By way of example, one embodiment of chemical mixing system 10 is configured to blend ultra-pure water (the first chemical constituent) with concentrated HF (49% HF, the second chemical constituent) to a concentration of 4.9 weight % HF. The nominal mix batch volume in this embodiment is 1.5 gallons. To yield a 1.5 gallon mix vessel batch of mixed chemical having this desired concentration, vessel 12 should be filled with 1.35 gallons of ultra-pure water, and 0.15 gallons of concentrated HF. The first mix vessel level sensor S1 is therefore positioned at a level at which the sensor will provide signals indicating when the mix vessel 12 is filled to a volume level of 1.35 gallons. The second mix vessel level sensor S2 is positioned at a level at which the sensor will provide signals indicating when the mix vessel 12 is filled to a volume level of 1.5 gallons. In this embodiment the third mix vessel level sensor S3 and the fourth mix vessel level sensor S4 are set at volume levels of about 1.46 gallons and 1.54 gallons, respectively. Mix vessel batches made by filling mix vessel 12 beyond the first volume level to these third and fourth volume levels will have a concentration of about 3.6 and 6.2 weight % HF, respectively. Assuming the mix drum is filled to a level of about 10 gallons, the addition of mix batches at these concentration levels will change the concentration of the mixed chemical within the mix drum by about 0.1 weight %.

First mix drum level sensor S5 is positioned at a first or relatively low volume level on mix drum 14. Second mix drum level sensor S6 is positioned at a second or relatively high volume level on the mix drum 14. In the embodiment described above where mix drum 14 has a nominal capacity of about 15 gallons, first mix drum sensor S5 is set to measure a relatively low volume level of about 2 gallons, and second mix drum sensor S6 is set to measure a relatively high volume level of about 13 gallons.

The operation of mixing system 10 is controlled by controller 62. In particular, controller 62 can be operated in a mixing mode during which mix batches of the chemical constituents are blended in mix vessel 12 and transferred to mix drum 14. Controller 62 can also operate in a chemical transfer mode and a recirculation mode. During transfer mode operation the vacuum/pressure/vent system 36 operates pressure/vacuum vessels 15 and 17 in such a manner as to transfer the chemical in the mix drum 14 to a point-of-use station through lines 54 and 51. During recirculation mode operation the vacuum/pressure/vent system 36 operates pressure/vacuum vessels 15 and 17 in such a manner as to recirculate the chemical through lines 54, 51 and 53 back to the mix drum 14. Recirculation mode operation is used to completely mix the mix batches of chemical constituents in mix drum 14. Although not shown, other well known methods including an agitator in the mix drum 14 can be used to mix the chemical in the mix drum.

Figure 3:
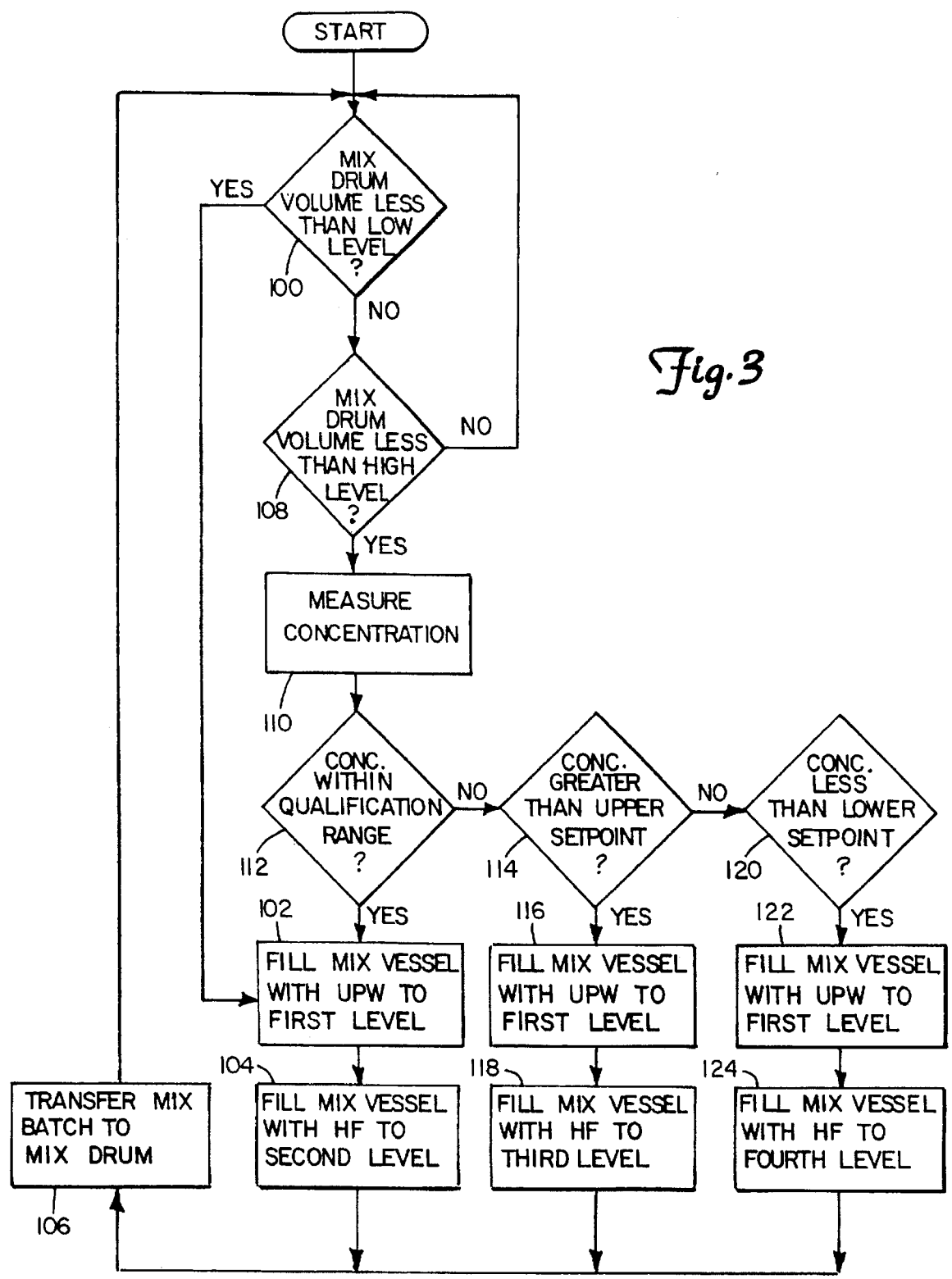
FIG. 3 is a flow diagram of the mixing mode operation of the chemical mixing and control systems.

Mixing mode operation of controller 62 can be described with reference to FIG. 3. Upon the initiation of mixing mode operation, and thereafter whenever mix drum level sensor S5 indicates that the level of mixed chemical within mix drum 14 is below the low volume level (step 100), controller 62 causes "regular" concentration batches of chemical to be mixed in mix vessel 12 in accordance with steps 102 and 104. To mix a regular concentration batch of chemical, controller 62 causes vacuum/pressure/vent system 36 to vent the mix vessel 12. Control valve V2 is then opened to allow ultra pure water to flow into mix vessel 12. When level sensor S1 indicates that the mix vessel 12 has been filled to the first volume level, controller 62 closes valve V2 to complete step 102. Controller 62 then causes vacuum/pressure/vent system 36 to draw a vacuum in mix vessel 12. After the vacuum is established, valve V1 is opened to allow concentrated HF to flow into mix vessel 12. When level sensor S2 indicates that the mix vessel 12 has been filled to the second volume level, controller 62 closes valve V1 to complete step 104.

After the batch is mixed, it is transferred to mix drum 14 as indicated by step 106. To perform the mix batch transfer, controller 62 causes vacuum/pressure/vent system 36 to pressurize mix vessel 12, and opens valve V3. The mixed batch of chemical is thereby motivated into the mix drum 14 through line 38. When sensor S7 indicates that the mix vessel 12 has been emptied, controller 62 closes valve V3 to end step 106. As is shown by FIG. 3, steps 100, 102, 104 and 106 are repeated to mix and transfer to mix drum 14 regular concentration batches of chemical until the mix drum is filled to the low level.

Recirculation mode operation of system 10 is initiated by controller 62 when mix drum 14 is filled to the low level determined by sensor 55. Whenever sensor S5 indicates that the level of chemical within mix drum 14 is greater than or equal to the low level (step 100) and sensor S6 indicates that the chemical level is less than the high level (step 108), controller 62 determines the then current concentration of the chemical within the mix drum as indicated by step 110. If at step 112 controller 62 determines that the measured concentration of the chemical within drum 14 is less than or equal to the Upper Qualification Range Setpoint and greater than or equal to the Lower Qualification Range Setpoint (i.e., within the desired qualification range), the controller causes a regular concentration batch of chemical to be mixed in mix vessel 12 and transferred to the mix drum in the manner described above (steps 102, 104 and 106).

If the measurement made at step 110 indicates that the then current concentration of the chemical within the mix drum 14 is greater that the Upper Qualification Range Setpoint (step 114), controller 62 causes a "low" concentration batch of chemical to be mixed in mix vessel 12 in accordance with steps 116 and 118. To mix a low concentration batch of chemical, controller 62 causes vacuum/pressure/vent system 36 to vent mix vessel 12. Valve V2 is then opened to allow ultra pure water to flow into mix vessel 12. When level sensor S1 indicates that the mix vessel 12 has been filled to the first volume level, controller 62 closes valve V2 to complete step 116. Vacuum/pressure/vent system 36 is then operated to draw a vacuum in the mix vessel 12. After the vacuum is established, valve V1 is opened to allow concentrated HF to flow into mix vessel 12. When level sensor S3 indicates that the mix vessel 12 has been filled to the third volume level, controller 62 closes valve V1 to complete step 118. The low concentration batch of chemical is then transferred to the mix drum 14 in accordance with step 106 described above. The addition of the low concentration mix batch of chemical to mix drum 14 will reduce the concentration of the chemical within the mix drum, and is done to lower the concentration to the desired concentration.

If the measurement made at step 110 indicates that the then current concentration of the chemical within the mix drum 14 is lower that the Lower Qualification Range Setpoint (step 120), controller 62 causes a "high" concentration batch of chemical to be mixed in mix vessel 12 in accordance with steps 122 and 124. To mix a high concentration batch of chemical, controller 62 causes vacuum/pressure/vent system 36 to vent mix vessel 12. Valve V2 is then opened to allow ultra pure water to flow into mix vessel 12. When level sensor S1 indicates that the mix vessel 12 has been filled to the first volume level, controller 62 closes valve V2 to complete step 122. Vacuum/pressure/vent system 36 is then operated to draw a vacuum in the mix vessel 12. After the vacuum is established, valve V1 is opened to allow concentrated HF to flow into mix vessel 12. When level sensor S4 indicates that the mix vessel 12 has been filled to the fourth volume level, controller 62 closes valve V1 to complete step 124. The high concentration batch of chemical is then transferred to the mix drum 14 in accordance with step 106 described above. The addition of the high concentration mix batch of chemical to mix drum 14 will increase the concentration of the chemical within the mix drum, and is done to raise the concentration to the desired concentration.

The generation of mix batches of chemical and the addition of the batches to the mix drum 14 in the manner described above continues until sensor S6 indicates that the mix drum is filled with blended chemical to a level greater than or equal to the high level as shown at step 108. Thereafter, when mixed chemical is transferred to the point-of-use station and sensor S5 indicates that the level of chemical has dropped below the low level, the steps described above are repeated.

Although the present invention has been described with reference to preferred embodiments, those skilled in the art will recognize that changes can be made in form and detail without departing from the spirit and scope of the invention.

What is claimed is:

1. A chemical mixing system for mixing at least first and second chemical constituents to obtain mixed chemical having a desired concentration within a qualification range, including:

a first constituent inlet for receiving a first chemical constituent;

a second constituent inlet for receiving a second chemical constituent;

a mix vessel for mixing mix vessel batches of the first and second chemical constituent;

a first line for fluidly coupling the first constituent inlet to the mix vessel, and including a first line valve for controlling the flow of the first chemical constituent through the first line;

a second line for fluidly coupling the second constituent inlet to the mix vessel, and including a second line valve for controlling the flow of the second chemical constituent through the second line;

first mix vessel level sensing means for providing first vessel level signals when the mix vessel is filled to a first level, wherein the first level corresponds approximately to the volume of the first chemical constituent that will provide mix vessel batches having the desired concentration;

second mix vessel level sensing means for providing second vessel level signals when the mix vessel is filled to a second level, wherein the second level is a level greater than the first level by an amount which corresponds approximately to the volume of the second chemical constituent that will provide mix vessel batches having the desired concentration;

third mix vessel level sensing means for providing third vessel level signals when the mix vessel is filled to a third level which is greater than the first level and less than the second level;

fourth mix vessel level sensing means for providing fourth vessel level signals when the mix vessel is filled to a fourth level which is greater than the second level;

a mix drum for holding and mixing a plurality of mix vessel batches of the mixed chemical;

a mix drum line for fluidly coupling the mix vessel to the mix drum, and including a drum line valve for controlling the flow of the mixed chemical through the mix drum line;

a concentration monitor for providing concentration signals representative of the concentration of mixed chemical within the mix drum; and a control system coupled to the first line, second line and drum line valves, the first second, third and fourth mix vessel level sensing means and the concentration monitor, for controlling the mixing of the chemical constituents in the mix vessel and the transfer of the mix vessel batches to the mix drum, including:

first control means for actuating the first line valve to fill the mix vessel to the first level with the first chemical constituent;

second control means for actuating the second line valve to fill the mix vessel from the first level to the second level with the second chemical constituent if the concentration of the blended chemical within the mix drum is within the qualification range;

third control means for actuating the second line valve to fill the mix vessel from the first level to the third level with the second chemical constituent if the concentration of the blended chemical within the mix drum is greater than the qualification range;

fourth control means for actuating the second line valve to fill the mix vessel from the first level to the fourth level with the second chemical constituent if the concentration of the blended chemical within the mix drum is less than the qualification range; and fifth control means for actuating the drum line valve to transfer the mix vessel batch of mixed chemical to the mix tank.

2. The chemical mixing system of claim 1 wherein:

the system further includes high mix drum level sensing means for providing high drum level signals when the mix drum is filled to a relatively high level; and the control system is coupled to the high mix drum level sensing means and further includes sixth control means for causing mix vessel batches to be mixed and transferred to the mix drum only if the level of mixed chemical within the mix drum is less than the relatively high level.

3. The chemical mixing system of claim 2 wherein:

the system further includes low mix drum level sensing means for providing low drum level signals when the mix drum is filled to a relatively low level; and the control system is coupled to the low mix drum level sensing means and further includes means for actuating the second line valve to fill the mix vessel from the first level to the second level with the second chemical constituent, and not the third or fourth levels, when mixing mix vessel batches if the level of blended chemical in the mix drum is less than the relatively low level.

4. The chemical mixing system of claim 1 wherein:

the system further includes low drum level sensing means for providing low drum level signals when the mix drum is filled to a relatively low level; and the digital control system is coupled to the low mix drum level sensing means and further includes means for actuating the second line valve to fill the mix vessel from the first level to the second level with the second chemical constituent, and not the third or fourth levels, when mixing mix vessel batches if the level of blended chemical in the mix drum is less than the relatively low level.

5. The chemical mixing system of claim 1 and further including a vacuum system for motivating the first and second chemical constituents into the mix vessel.

6. The chemical mixing system of claim 5 and further including a pressure system for motivating the mix vessel batches from the mix vessel to the mix drum.

7. The chemical mixing system of claim 6 and further including a pressure system for motivating the mixed chemical from the mix drum.

8. The chemical mixing system of claim 1 and further including:

a recirculation line for recirculating mixed chemical in the mix drum; and motivating means for motivating chemical from the mix drum through the recirculation line.

9. The chemical mixing system of claim 8 and further including means for mounting the concentration monitor in the recirculation line.

10. The chemical mixing system of claim 1 wherein the mix vessel is smaller than the mix drum.

* * * * *